United States Patent [19]

Mulholland

[11] Patent Number: 4,966,379

[45] Date of Patent: Oct. 30, 1990

[54] RECLINABLE WHEELCHAIR

[75] Inventor: Lawrence K. Mulholland, Ventura, Calif.

[73] Assignee: Mulholland Designs, Inc., Wilmington, Del.

[21] Appl. No.: 155,998

[22] Filed: Feb. 16, 1988

Related U.S. Application Data

[63] Continuation-in-part of Ser. No. 109,777, Oct. 19, 1987, abandoned.

[51] Int. Cl.⁵ .......... B62D 63/02

[52] U.S. Cl. .......... 280/242.1; 280/250.1; 280/650

[58] Field of Search .......... 280/242 WC, 289 WC, 280/647, 648, 649, 650, 42, 242.1, 657, 658, 250.1; 297/DIG. 4

[56] References Cited

U.S. PATENT DOCUMENTS

| | | | |
|---|---|---|---|
| 3,191,990 | 6/1965 | Rugg et al. | 297/DIG. 4 X |
| 3,787,089 | 1/1974 | Wrethlander | 297/DIG. 4 |
| 3,964,786 | 6/1976 | Mashuda | 280/242 WC X |
| 4,046,418 | 9/1977 | Smith et al. | 297/DIG. 4 X |
| 4,231,614 | 11/1980 | Shaffer | 297/DIG. 4 X |
| 4,335,900 | 6/1982 | Fleischer | 280/649 |
| 4,555,121 | 11/1985 | Lockard et al. | 280/648 X |
| 4,577,878 | 3/1986 | Roy et al. | 280/242 WC |
| 4,613,151 | 9/1986 | Kielczewski | 280/250.1 |
| 4,632,450 | 12/1986 | Holdt | 297/DIG. 4 X |
| 4,679,849 | 7/1987 | Torgney | 280/242 WC X |
| 4,741,547 | 5/1988 | Tholkes | 297/DIG. 4 X |

FOREIGN PATENT DOCUMENTS 2700692 5/1978 Fed. Rep. of Germany .

*Primary Examiner*—Charles A. Marmor
*Assistant Examiner*—Anne Marie Boehler
*Attorney, Agent, or Firm*—Kenneth J. Hovet

[57] ABSTRACT

A wheelchair having opposing sideframes each of which comprise a base section which is pivotally connected by a brace member to an inclinable seat section. An extender mechanism interconnects the seat section to a brace member and provides releasable securement for a wheelchair seat at selected angular positions. Backrest bars are independently adjustable with a similar extender mechanism that interconnects the bars with a respective seat section. The sideframes are spaced-apart with hinged spacer bars which includes a latching device for releasably securing the bars in an open position. The bar and frame sections have elongated slots containing fasteners for adjustable connections with fasteners from adjunct wheelchair assemblies.

27 Claims, 5 Drawing Sheets

RECLINABLE WHEELCHAIR

CROSS-REFERENCE TO RELATED APPLICATIONS

This application is a Continuation-In-Part of U.S. Application Ser. No. 109,777 filed Oct. 19, 1987 now abandoned.

BACKGROUND OF THE INVENTION

1. Field of the Invention

The present invention relates to adjustable wheelchairs and, more particularly, to wheelchairs having an angularly adjustable backrest and seat.

2. Description of Related Art

Reclinable wheelchairs have evolved in accordance with special needs of patients as well as improving comfort and convenience of use. Exemplary prior art mechanisms for tilting backrests are shown in U.S. Pat. No. 3,815,586. Here, pivot bars extend from opposing armrests into the side edges of the backrest. A multi-orificed side plate allows for repositioning of the pivot bars and adjustment of the backrest tilt angle. The wheelchair seat is pivoted at its back edge and the front edge may be adjustably lifted with a toothed rack and pin device.

A problem with the above is the numerous individual adjustments that must be made for each movement. Also, the mechanisms are bulky and add weight to the overall chair. Further, the chair is not readily collapsible because the backrest and seat must be stiff and self-sustaining.

In G.B. Patent Application 2029334, a subassembly of arm, seat and foot rests all tilt together relative to the wheelchair frame. The pivot axis is at the seat and back junction. This arrangement entirely lacks versatility. It also involves the use of two separate structural frame assemblies which about doubles the weight.

G.B. Patent Applications 2136742, 2158350 and 2171898 provide wheelchair mechanisms whereby reclining the backrest causes a corresponding forward movement of the seat. This maintains a lowered center of gravity for the wheelchair occupant and a more stable wheelchair disposition. However, it is unnecessary to always combine seat movement with backrest tilting. Particularly with severely handicapped patients, it is better to have the backrest separately adjustable. Such also lessens the bulk and complexity of the wheelchair mechanisms and greatly facilitates collapsibility.

SUMMARY OF THE INVENTION

The present invention provides a wheelchair having an adjustable seat which simultaneously moves forward and tilts upwardly. The wheelchair further includes a backrest which is adjustable relative to the seat and is also tiltable. Both the adjustment and tilting actions are independent of seat movement.

To accomplish the above and other functions, the wheelchair utilizes unique sideframes in combination with extender means. The sideframes each comprise a base section and seat section which are pivotally connected by brace means. A seat extender means is used to interconnect the seat section and brace means for regulating the angular disposition of the seat section.

A backrest extender means is used to interconnect and control the inclination of backrest bars relative to the seat section. Remote actuating means allows for convenient operation of both extender means.

A front leg section is also pivoted to the seat section. This section is used to support a leg carrier and/or foot rest means. Angular adjustment is accomplished with an adjustable strut means.

The base, front and seat sections and the backrest bars include track means with slide fasteners. These components permit a wide variety of adjustable connections with wheelchair accessories and other structural parts. They also facilitate attachment of a folding assembly which may be used to releasably space-apart the opposing sideframes.

DESCRIPTION OF THE PREFERRED EMBODIMENTS

Figure 1:
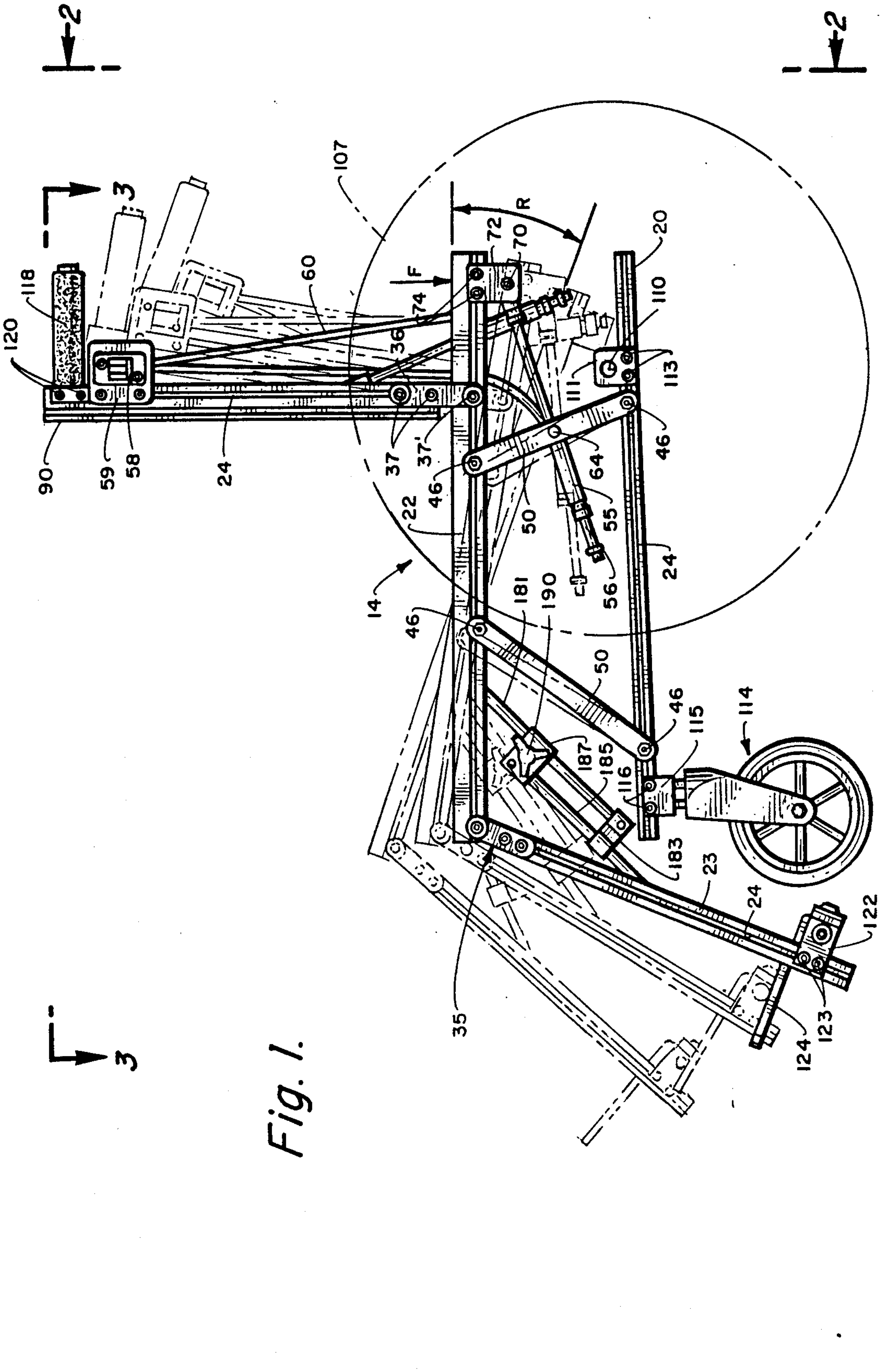
FIG. 1 is a side elevational view of a wheelchair framework constructed in accordance with the present invention.
Figure 2:
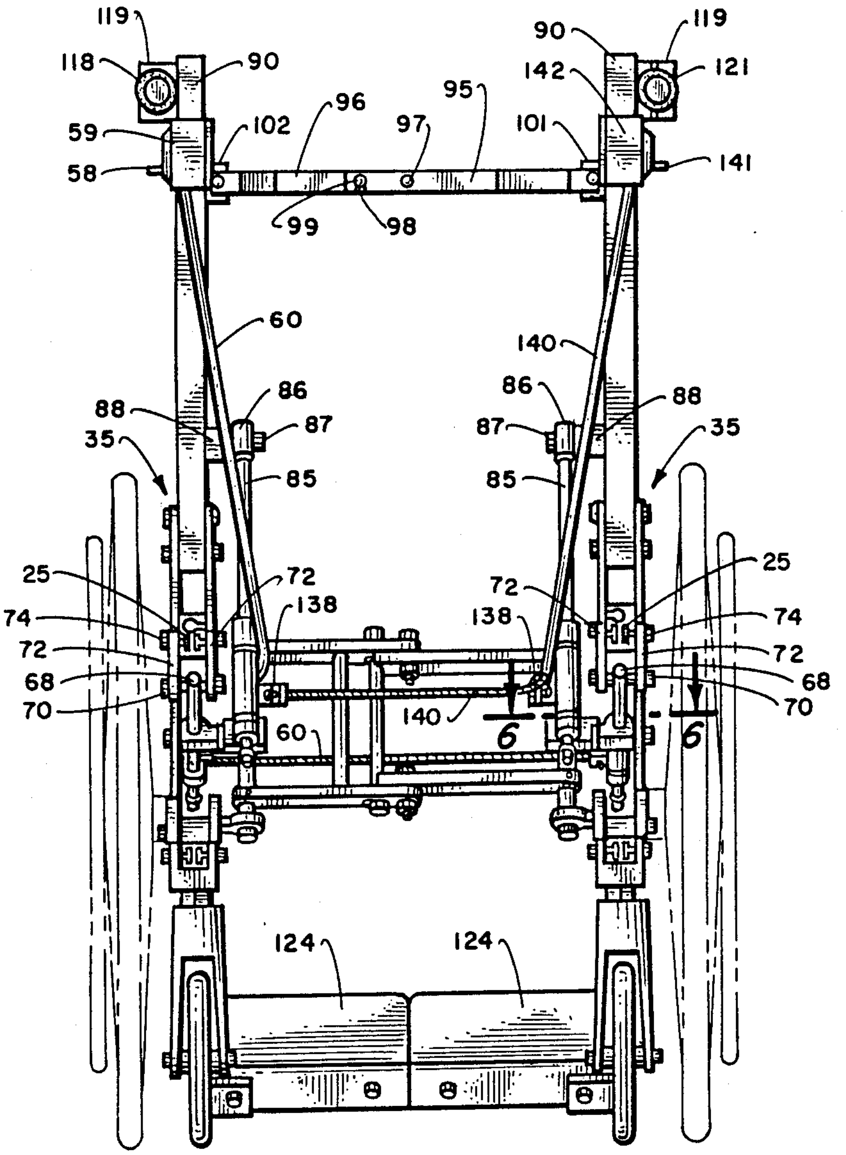
FIG. 2 is a back elevational view taken along lines 2—2 of FIG. 1.
Figure 3:
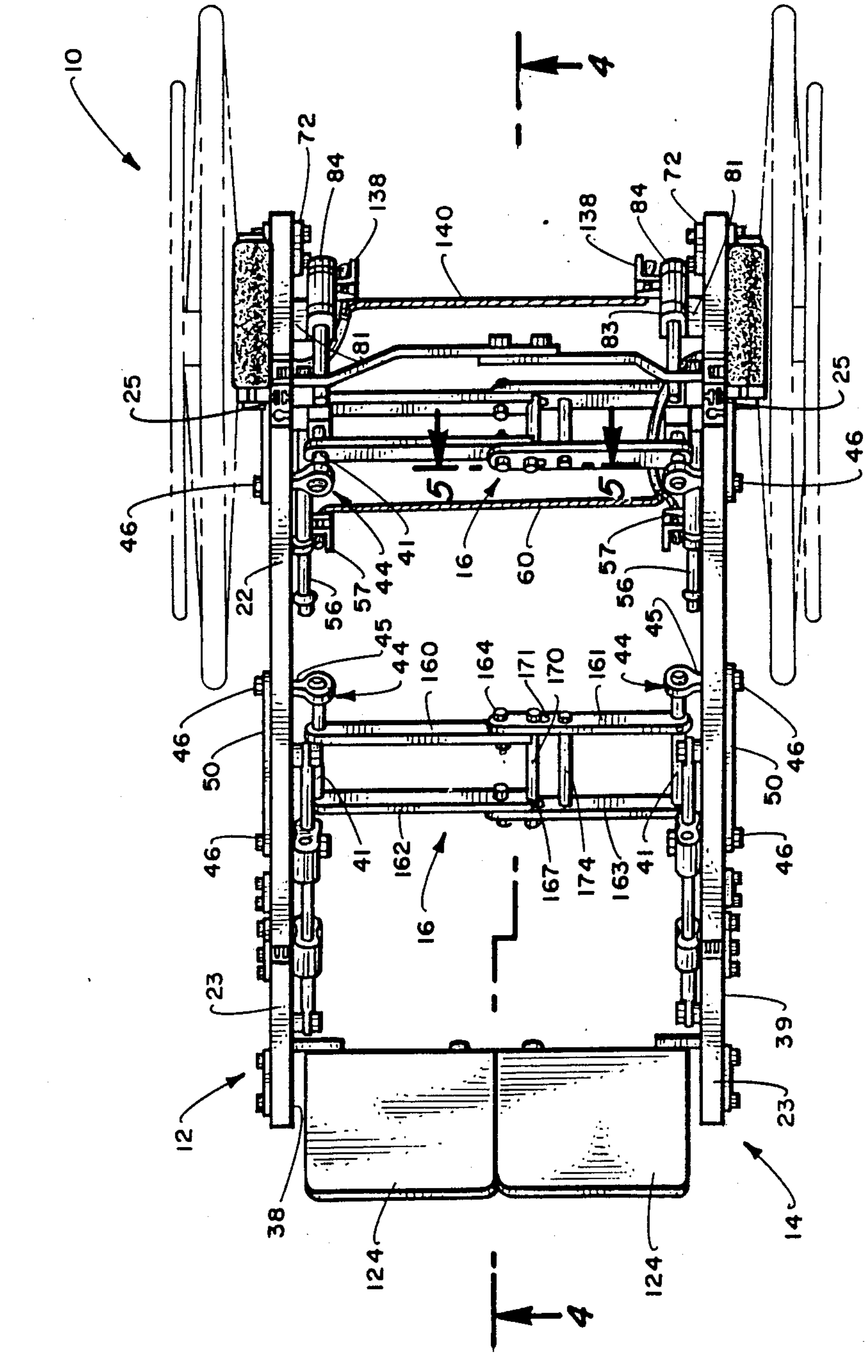
FIG. 3 is a top plan view taken along lines 3—3 of FIG. 1.

With reference to FIGS. 1—3 of the drawings, the unique wheelchair framework of the invention is shown generally by reference 10. The framework includes two generally parallel spaced-apart sideframes 12,14. The sideframes are usually configured to be mirror-images of each other. Although they may be fixed in a spaced-apart relationship by conventional cross-pieces or an inflexible seat (not shown), the sideframes are preferably movable toward each other by a folding assembly 16.

Figure 4:
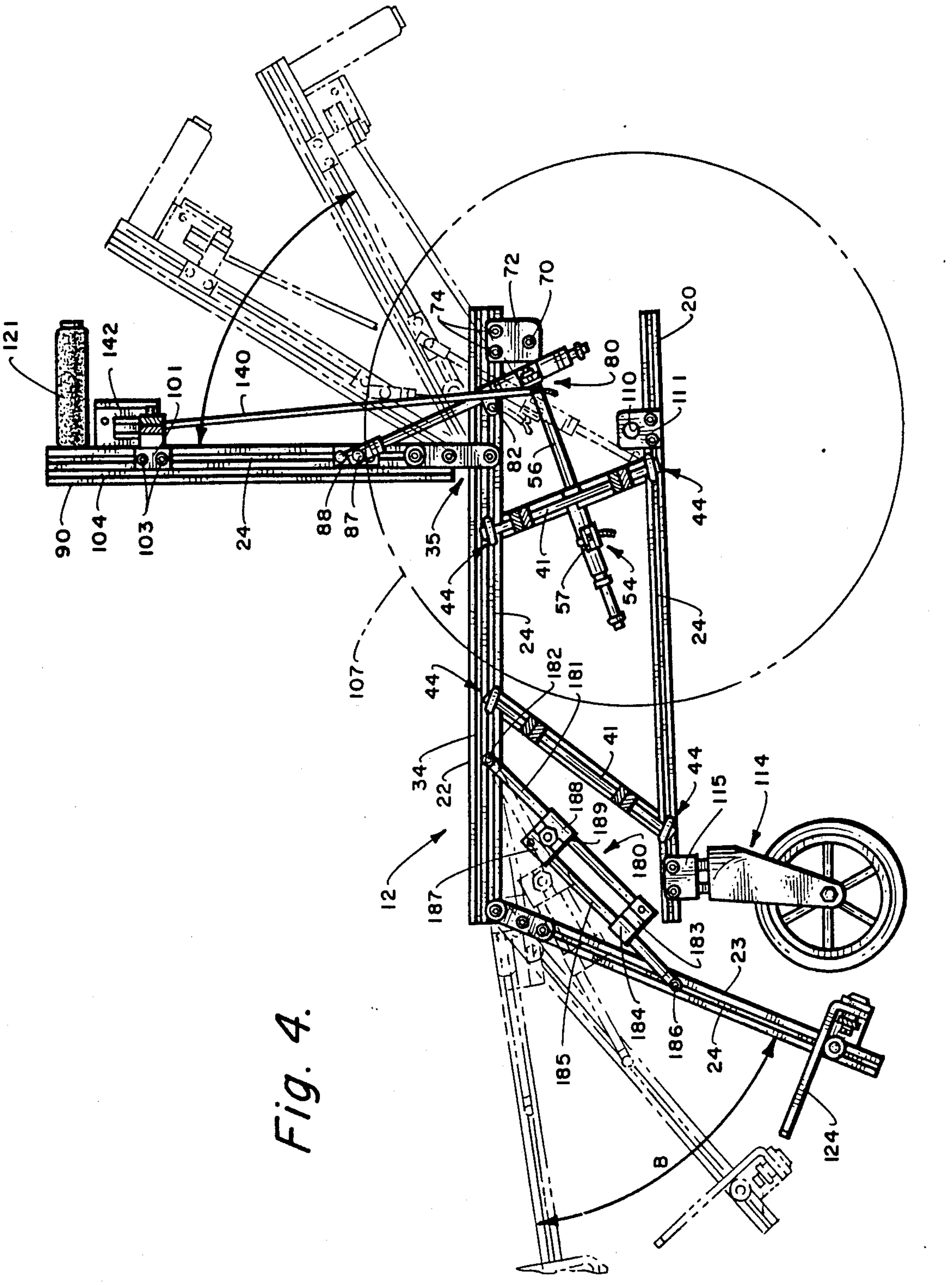
FIG. 4 is a side elevational view taken along lines 4—4 of FIG. 3.

With particular reference to FIGS. 1 and 4, each sideframe includes a base frame section 20 and a seat frame section 22. The sections consist of linear structural elements preferably of lightweight extruded aluminum, alloys of titanium or aluminum, or composite plastic. Each section includes a track means which, as shown, comprises an undercut slot 24 extending laterally along at least one, and preferably two, opposing frame section sides.

Most conveniently, the slots extend throughout the length of the inner face 38 and outer face 39 of each section. Each slot has a cross-sectional shape corresponding to the outline of a slidable fastener 25 which is retained therein. The slots preferably have a T-shaped cross-section whereby the slidable fasteners may comprise a conventional square nut having a threaded opening accessible through said slot.

As will be hereinafter apparent, the number of slidable fasteners contained in each track means will be dictated by the frame section connections and the requirements of supplemental engagement means. Further, it will be appreciated that track means may include slotted strips or sliding bolt means and the like which may be secured to one or more of the frame section faces.

The aforementioned base section functions as the sideframe foundation and supports the wheelchair wheels. The seat section is positioned above, and generally coextensively with, the base section. It is supported by a brace means which also allows movement relative to the base section. The seat section also provides support for a seat (not shown). If a folding seat with enlarged edges is used, as set forth in the (above-referenced parent application), the seat section may include seat engagement means shown as seat keyway 34.

With reference to FIGS. 3 and 4, the brace means includes at least one elongated brace member 41 having an upper end attached to the seat section and a lower end attached to the base section. To effect a sound sideframe structure, two first and second spaced-apart brace members are preferably used per sideframe which are connected to respective back and forward portions of said base section. It is also helpful if the members incline toward each other to facilitate their dual axis function as will be hereinafter described.

The opposing ends of each brace member are provided with a pivot joint assembly 44. Such assembly may be any one or combination of a joint means selected from the group consisting of ball joint, universal joint, pivot shaft, swivel means and hinge means. As shown, the assembly includes a ball joint means having a joint shaft 45 which extends into slot 24 for securement with a slide fastener 25. Alternatively, the joint shaft may pass entirely through each section for securement with external fastener 46.

Each brace member may include longitudinal adjustment means known in the art. For example, inner rod 47 that merges into the ball joint means may be threaded at its end portion for engagement with corresponding threads on member 41. This provides a simple means for axial adjustment and facilitates variable spacing and inclination of the brace members between the frame sections.

To strengthen the sideframe structure, the brace means may include side plates 50. The side plates are flat elongated structural elements which are preferably aligned and coextensive with each brace member. Each plate includes opposing end apertures through which extend respective joint shafts 45. The plates are pivotally secured to each shaft by the aforementioned external fasteners 46. In this way, when the seat section is moved, the side plates will rotate about each respective joint shaft.

The side plates may also be used to help support a seat mounting unit 62 for attachment to seat extender means 54. The seat extender means includes a seat housing 55 through which reciprocates seat shaft 56. The shaft may be locked at any position upon release of a seat locking means shown as catch 57. A seat actuating means shown as trigger 58 and cable 60 operate the catch. The trigger is mounted in panel 59 for finger movement adjacent left handle bar 118. Cable 60 is used to transmit trigger movement to the catch. It will be understood that the extender means may be operated by other actuating means known in the art such as hydraulic, pneumatic or electro-magnetic means.

Figure 6:
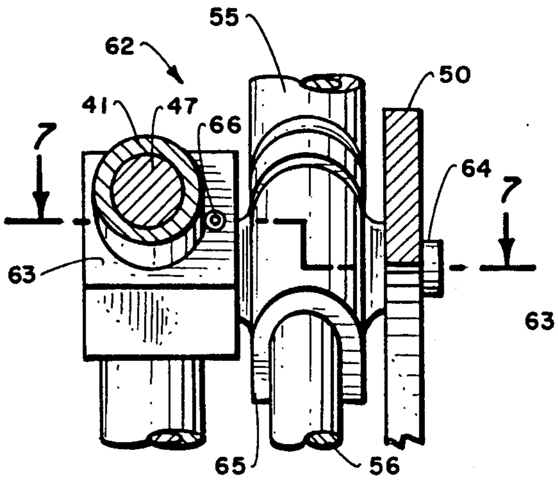
FIG. 6 is an enlarged cross-sectional view taken along line 6—6 of FIG. 2.
Figure 7:
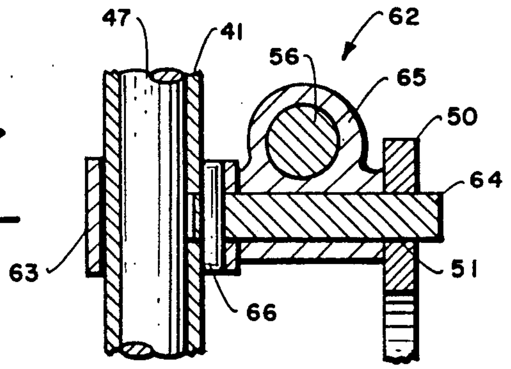
FIG. 7 is a cross-sectional view taken along lines 7—7 of FIG. 6.

With particular reference to FIGS. 6 and 7, seat mounting unit 62 is shown as being rotatably connected to brace block 63 by seat axle 64. The axle extends transversly from side plate axle opening 51 through housing collar 65 into the brace block. A stay pin 66 secures the axle to the brace block.

The movable seat shaft 56 includes seat connector end 68. A cross axle 70 extends between connector plates 72 through a transverse aperture in the connector end. The plates are adjustably secured with plate fasteners 74 and slide fasteners 25 to a location proximate the back portion of each seat section.

Actuation of trigger 58 will open catch 57 via cable 60 and release shaft 56 for axial movement through housing 55. With reference to FIG. 1, application of downward force proximate said back portion (arrow F) will allow the seat frame section 22 to rotate (arrow R) and move slightly forward. A dual axis of rotation located at each joint shaft seat section connection is created by the above actions and structure. Note that both axis will also move in a slight arc as a result of rotation about each joint shaft in the lower base section 20.

With the above arrangement, the amount of (seat) inclination is readily and conveniently controlled simply by trigger movement with a finger from a user's hand that may be simultaneously grasping handle bar 118. It will also be appreciated that the degree of inclination per amount of back portion downward movement can be adjustably altered by varying the angularity and length of the side plates and corresponding brace members.

As previously indicated, both sideframes are mirror images of each other including all the aforementioned parts. Therefore, like parts are coextensive to each other and all movements described above with respect to sideframe 14, will apply equally to sideframe 12. This will result in unified movement of the wheelchair patient support parts including the seat, backrest means, footrest and arms. Particulars of those parts not shown or discussed herein may be obtained by reference to the aforementioned parent application.

An additional desirable feature of the invention is the ability to adjust the backrest tilt independent of seat inclination. As shown in FIGS. 1, 2 and 4, the backrest includes a pair of upstanding backrest bars 90. Each bar is pivotally joined to a respective seat section 22 by link means 35.

Although various types of H brackets, yoke bars, clamps and braces could be used for the link means, the preferred means is shown as connector elements 36 with link fasteners 37. The connector elements are flat generally rectangular plates having spaced-apart orifices through which the link fasteners extend. The link fasteners preferably comprise bolts which are threaded to engage the female threads of the slidable fasteners 25. Other types of link fasteners could be used as dictated by the particular link means and track means being utilized such that the invention should not be limited by any specific fastening system.

The link fastener orifices are arranged to include at least two at a securement end portion of each connector element and one at an opposing pivot end portion thereof. As so arranged, link fasteners extending through the securement end orifices into engagement with the respective slidable fasteners, will serve mainly to firmly fix the element to the end of a bar or frame section. However, the link fastener extending through the pivot end orifice into engagement with a slidable fastener on the adjacent connecting bar or frame section, will function as a pivot until tightened. Thus, an angularly adjustable joint is formed between the connecting bar or frame section. Further, the joint will be longitudinally adjustable as a result of the slidable fastener on the adjacent bar or frame section. Still further, the connector elements can be reversed for allowing either bar or frame section to be pivotable.

Since the cross-sectional shape of the backrest bars and seat sections are substantially identical, the link means can include the above-described connector elements 36 with link fasteners 37 and pivot end fasteners 37'. As shown, the connector elements are positioned at opposing sides of the lower end of each backrest bar. Link fasteners 37 engage corresponding slidable fasteners contained within slots 24. The pivot portion of each connector element extends beyond the end of the backrest bar and overlies respective inner and outer faces of the seat section. Pivot link fasteners are then used to engage corresponding slidable fasteners in the seat section slots.

To strengthen the backrest joints and provide for convenient adjustability, a backrest extender means 80 is used to pivotally interconnect the backrest bar and seat section. Such means is identical to the seat extender means except for connection variations. A slider block 81 is adjustably secured to slide fasteners in the seat section. A collar axle 82 extends transversely through collar 83 of backrest housing 84. An end of the axle threadably engages corresponding threads in the slider block thereby forming an axis about which the backrest housing can rotate.

Backrest shaft 85 reciprocates within the housing and includes backrest connector end 86. Cross axle 87 extends through a transverse aperture in the connector end and threadably engages spacer block 88. The block is adjustably secured to the backrest bar 90 via engagement of block fasteners with backrest slide fasteners.

A backrest locking means includes clip 138 for releasably locking the shaft 85. The backrest actuating means comprises cable 140 which connects the clip to trigger 141 which is mounted on panel 142. The panel is attached to the upper backrest bar adjacent right handle 121. This provides a convenient finger release and allows for angular adjustment of the backrest in the same manner as described with respect to the seat extender means.

Note that inclination of the seat sections by application of force F may be accomplished through the handles and backrest bars. Further, it will be appreciated that the backrest housing and backrest shaft connections may be reversed whereby the housing may connect with the backrest bar and the shaft may connect with the seat section. Similarly, the seat housing and seat shaft connections may also be reversed.

To provide upper backrest support, a pair of hinged support arms 95,96 are used to interconnect with opposing upper portions of the backrest bars. The arms are hinged at inner ends by support pin 97. The arms include a lock means to releasably maintain an open colinear position. The lock means comprises hook 98 at an extended portion of arm 95 that engages a hook pin 99 projecting from arm 96 when the arms are in longitudinal alignment.

The opposing outer end of each support arm is hinged to a respective arm block 101,102. Each block is provided with arm fasteners 103 that engage slidable fasteners in the backrest bars. This connection allows adjustment and movement of the support arms up and down the backrest bars.

The backrest bars further include backrest keyways 104. A back support structure, such as that set forth in the parent application, includes enlarged opposing side edges which slide into the keyways at the open end of each backrest bar. The back support structure can be rigid as with a non-collapsing wheelchair, or it can be flexible for a wheelchair that folds together.

The folding assembly 16 of he invention is most conveniently attached to opposing sideframes via the above-described brace means. This eliminates additional multiple connections to the frame sections, saves cost, minimizes weight and prevents interference with sideframe adjustability. The assembly includes at least one pair of hinged spacer bars having a releasable latching means for securing the hinged bars in an open position.

With reference to FIGS. 2 and 3, an illustative folding assembly is shown comprising a pair of upper spacer bars 160,161 and lower spacer bars 162,163. Each pair includes overlapping inner end portions having aligned openings through which a pivot shaft 164 extends. The shaft is secured by nut 165. The outer ends of each bar are secured to respective opposing brace members 41.

The bar connections to each brace member preferably occur adjacent to the ends of the member. In this way, greater leverage occurs to pivot the assembly and move the sideframes in and out. Also, as a result of the bars being connected at spaced-apart locations on the brace member, a stronger more stable alignment occurs between the opposing sideframes.

The pivot shaft is located at the inner end of outer bars 161,163 and at a location inwardly offset from the end of inner bars 160,162. The offset portions of the inner bars thereby form locking arms 168. The arms swing beneath overlapping inner end portions of outer bars 161,163 when the bars are in straight alignment corresponding to a wheelchair open position.

To secure the bars in straight alignment, the outer end of each locking arm is provided with a recess 167. Offset inwardly from the inner end of the outer bars are latch slots 171. A spring opening 172 extends longitudinally inwardly from the outer bar to intersect and pass beyond the latch slots. That part of the opening beyond the slots contains spring 173.

While the spring is constrained in the containment part, a latch rod 170 is inserted through the slots 171. Upon release, the spring will function to bias inwardly the latch rod so the rod will firmly engage recess 167 when the bars are in straight alignment.

Figure 5:
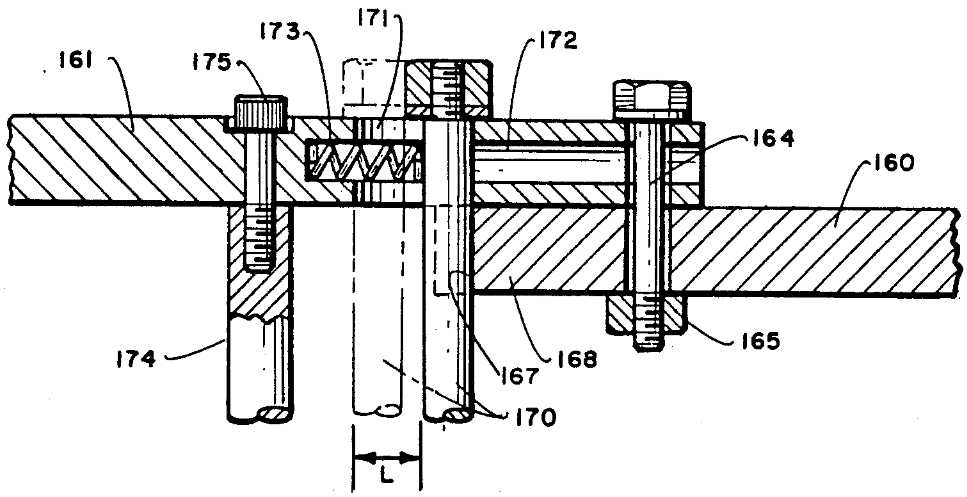
FIG. 5 is an enlarged cross-sectional view taken along lines 5—5 of FIG. 3.

A leverage rod 174 is secured by rod fastener 175 between the outer bars in a parallel and spaced-apart relationship to the latch rod. The leverage rod supports the outer bars and provides hand leverage when grasping the latch rod and moving it against the force of spring 173. As shown by arrow L in FIG. 5, with the latch rod withdrawn from recess 167, the hinged bars may pivot toward each other and draw the sideframes together.

Each seat section may include a front leg section 23. The leg section is preferably identical in construction to the base section. It includes slots 24 containing slide fasteners 25 for engagement with link means 35.

The leg section is attached to the front end portion of each seat section 22 by opposing connector elements and fasteners in the same manner as with backrest bars 90. The leg joint produced thereby with pivot fastener 37' may be reinforced by an adjustable strut means 180.

As best shown in FIGS. 1 and 4, the strut means includes a first strut bar 181 pivotally connected at its upper end by strut fastener 182 to a slide fastener in seat section 22. The opposing free end of the strut bar is secured to bracket 183 having a first annular part 184.

A second strut bar 185 is pivotally secured at its lower end by strut fastener 186 to a slide fastener in leg section 23. It extends through the first part 184 to an upper end which is secured to a junction part 187. The junction part includes a second annular part 188 having a slide opening 189 through which the first strut bar extends. The slide opening can be restricted with knob 190 to engage the strut rod.

As the leg section is moved, as shown by arrows B in FIG. 4, the second strut bar will move through the first annular part and cause the second annular part to slide along the first strut bar. When the desired angular disposition of leg section 23 is achieved, knob 190 will be tightened. This frictionally restrains further movement of the junction part along the first strut bar and secures the leg section in place.

The leg sections can include leg support means (not shown) and/or footrest plates 124. Footrest blocks 122 with fasteners 123 are used to connect the plates to slide fasteners in the leg section.

To further exemplify the advantages of the invention, it will be appreciated that attachment of adjunct wheelchair assemblies (such as brake means, casters, armrests and body support pads) can all be accomplished with supplemental connector means in conjunction with the slidable fasteners of the unique bar and frame sections. Use of the above in cooperating relation with the track means, allows the supplemental connections to be semi-permanent and adjustable. This feature together with the variable sideframe geometry, makes it possible for a single wheelchair to be adaptable for a wide variety of special needs and uses.

To illustrate the above, note conventional caster assemblies 114 which are secured to the forward portion of base section 20 by a caster block means. Such means provides a supplemental connector junction whereby a caster assembly is connected to caster block 115. The block, in turn, includes block fasteners 116 which engage slidable fasteners in the base section. The combined assembly can be moved, as desired, anywhere along slot 24.

Similarly, handles 118,121 are joined to the upper portion of respective backrest bars by supplemental means comprising a handle connector block 119. The block is split to frictionally engage the tubular handle base. Threaded handle fasteners 120 tighten the block to the handle. The fasteners also engage corresponding slidable fasteners in the backrest bars.

Conventional wheelchair drive wheels 107 (depicted in phantom in FIGS. 1–4) are secured to each opposing base section. Axle plates 111 are adjustable secured to opposing sides of base section 20 with plate fasteners 113. The plates include a threaded opening which engage the threads of the wheel axle (not shown). Note the plate and slide fastener connections permit adjustment of wheel location anywhere along the length of the base section which is not already occupied.

While the invention has been described with respect to preferred embodiments, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In a wheelchair having two spaced-apart laterally aligned structurally independent sideframe structures which cooperatively support wheelchair wheels, a seat and backrest; each one of said sideframe structures comprising:

a base frame section;

an angularly adjustable seat section connected to said base section by brace means comprising a first brace member pivotally connecting a back portion of said base section with said seat section and a second brace member pivotally connecting a forward portion of said base section with said seat section whereby each brace member provides a dual axis of rotation for movement of said seat section; and, a seat extender means interconnecting one of said brace members and said seat section having a seat housing through which extends a movable seat shaft including a seat locking means for releasably securing said shaft whereby said seat section can be moved to a desired position and be releasably maintained at said position by said locking means.

2. The sideframe of claim 1 wherein said base section and said seat section each comprise an elongated structural element.

3. The sideframe of claim 2 wherein said brace members incline toward each other and each member has opposing ends with a joint assembly proximate each end.

4. The sideframe of claim 2 wherein said seat housing is pivotally connected to said one of said brace members and said seat shaft is connected to said seat section.

5. The sideframe of claim 2 wherein each brace means includes a side plate adjacent each brace member pivotally interconnecting said seat section and said base section.

6. The sideframe of claim 5 wherein each of said elongated structural elements have opposing sides and said side plate is mounted on a side of each corresponding elongated structural element directly opposite and coextensive with each respective brace member.

7. The sideframe of claim 6 wherein said seat housing is pivotally connected to one of said brace members and a directly opposite side plate.

8. The sideframe structure of claim 1 including a backrest bar pivotally connected to said seat section.

9. The sideframe structure of claim 8 including a backrest extender means pivotally interconnecting said backrest bar and said seat section.

10. The sideframe of claim 9 wherein said backrest extender means comprises a backrest housing through which moves a backrest shaft including a backrest locking means for releasably securing said backrest shaft either one of, said backrest housing or backrest shaft being pivotally connected to said seat section with the other of said backrest shaft or backrest housing being pivotally connected to said backrest bar whereby said backrest bar can be inclined to a desired position relative to said seat section and be releasably maintained at said position by said backrest locking means.

11. The sideframe of claim 1 including seat actuating means for remotely operating said seat extender means.

12. The sideframe of claim 10 including backrest actuating means for remotely operating said backrest extender means.

13. The sideframe of claim 9 including a front leg section pivotally connected to said seat section; and, an adjustable strut means interconnecting said leg section and seat section to releasably secure the leg section at a desired angular position.

14. In a wheelchair having a seat, backrest means and wheels supported by a framework, said framework including:

a pair of spaced-apart structurally independent sideframes which are aligned on each lateral side of said wheelchair, each sideframe comprising a seat section adjustably separated from a base section by a brace means providing four axes of rotation comprising a first brace member connecting a back portion of said base section to said seat section and a second brace member connecting a forward portion of said base section to said seat section, each brace member having opposing ends with joint means for forming dual axis pivot connections with said seat section and said base section;

said sideframe including a seat extender means pivotally joining said seat section to one of said brace members, said seat extender means including a seat locking means for releasably securing said seat section at a desired position relative to said base section.

15. The wheelchair of claim 14 including a folding assembly connected to each sideframe for releasably spacing one sideframe from the other.

16. The wheelchair of claim 15 wherein said folding assembly includes at least one pair of spacer bars having pivotally connected inner end portions and outer ends attached to a respective sideframe.

17. The wheelchair of claim 16 wherein said outer ends are attached to said brace members.

18. The wheelchair of claim 17 wherein said folding assembly includes latching means for releasably securing said spacer bars in an open position.

19. The wheelchair of claim 14 wherein said backrest means includes a pair of backrest bars each being pivotally connected to a respective seat section; and, a backrest extender means pivotally interconnecting each backrest bar with a respective seat section.

20. The wheelchair of claim 19 wherein said backrest extender means includes a backrest locking means for releasably securing said backrest bars at a desired position relative to said seat section.

21. The wheelchair of claim 20 wherein said backrest bars include lateral slots which contain slidable bar fasteners and each of said backrest bars are connected to a respective seat section by backrest link means that include link fasteners which engage said slidable bar fasteners.

22. The wheelchair of claim 20 including a front leg section pivotally connected to said seat section; and, an adjustable strut means interconnecting said leg section and seat section to releasably secure the leg section at a desired angular position.

23. A wheelchair having a seat, backrest and wheels which are supported by two opposing structurally independent lateral sideframe structures, each sideframe structure comprising:

a base section;

a seat section spaced-apart and angularly movable on four axes of rotation relative to said base section;

brace means pivotally connecting each of said seat section and said base section, said brace means comprising a first brace member interconnecting a back portion of said base section with said seat section and a second brace member interconnecting a forward portion of said base section with said seat section, each of said brace members having opposing ends provided with joint means for forming respective pivot connections with said base section and said seat section; and, seat extender means interconnecting said seat section and one of said brace members for regulating the angular displacement of said seat section relative to said base section.

24. The sideframe of claim 23 wherein said seat extender means comprises a seat housing with a seat shaft movable through said housing, either one of said housing or shaft connected to said one brace member and either one of or other of said housing or shaft connected to said sat section, said seat extender means including a seat locking means for securing said shaft at a selected position relative to said housing.

25. The sideframe of claim 23 wherein said brace members are inclined toward each other and, said seat extender means includes remote actuating means for operating said locking means.

26. The sideframe of claim 25 wherein said brace means includes side plates pivotally connected to each of said base section and seat section, each side plate extending parallel and coextensively with a respective associated brace member.

27. The sideframe of claim 26 wherein said pivot joint assemblies include a joint shaft common to each side plate and brace member connection.

* * * * *